United States Patent [19]

Tatsuta

[11] Patent Number: 5,668,898
[45] Date of Patent: Sep. 16, 1997

[54] DEVICE FOR DETECTING THE INCLINATION OF IMAGE

[75] Inventor: Seiji Tatsuta, Tokyo, Japan

[73] Assignee: Olympus Optical Co., Ltd., Tokyo, Japan

[21] Appl. No.: 276,117

[22] Filed: Jul. 15, 1994

[30] Foreign Application Priority Data

Jul. 23, 1993 [JP] Japan .................................. 5-182568

[51] Int. Cl.⁶ .................................................. G06K 9/36
[52] U.S. Cl. .................................. 382/290; 388/168
[58] Field of Search ............................ 382/289, 290, 382/168, 170, 171; 358/494, 496–498

[56] References Cited

U.S. PATENT DOCUMENTS

| | | | |
|---|---|---|---|
| 3,936,800 | 2/1976 | Ejiri et al. .................... | 382/289 |
| 4,558,461 | 12/1985 | Schlang ........................ | 382/290 |
| 5,060,276 | 10/1991 | Morris et al. ................ | 382/289 |
| 5,506,918 | 4/1996 | Ishitani ........................ | 382/289 |

FOREIGN PATENT DOCUMENTS 63-282584  11/1988  Japan .

OTHER PUBLICATIONS

David E. Rumelhart et al; Parallel Distributed Processing –Explorations in the Microstructure of Cognition; 1988; pp. 322–331; Computational Methods of Cognition and Perception; The MIT Press; Cambridge, Mass & London, England.

*Primary Examiner*—Leo Boudreau
*Assistant Examiner*—Larry J. Prikockis
*Attorney, Agent, or Firm*—Frishauf, Holtz, Goodman, Langer & Chick

[57] ABSTRACT

An inclination detecting device includes a variable density image memory section for storing at least part of a variable density image obtained as a result of optically scanning a document image, a density varying direction detecting section for detecting density varying directions from the variable density image stored in the variable density image memory, and an inclination detecting section for detecting the inclination of an image constituting element from the distribution of density varying directions detected by the density varying direction detecting.

5 Claims, 13 Drawing Sheets

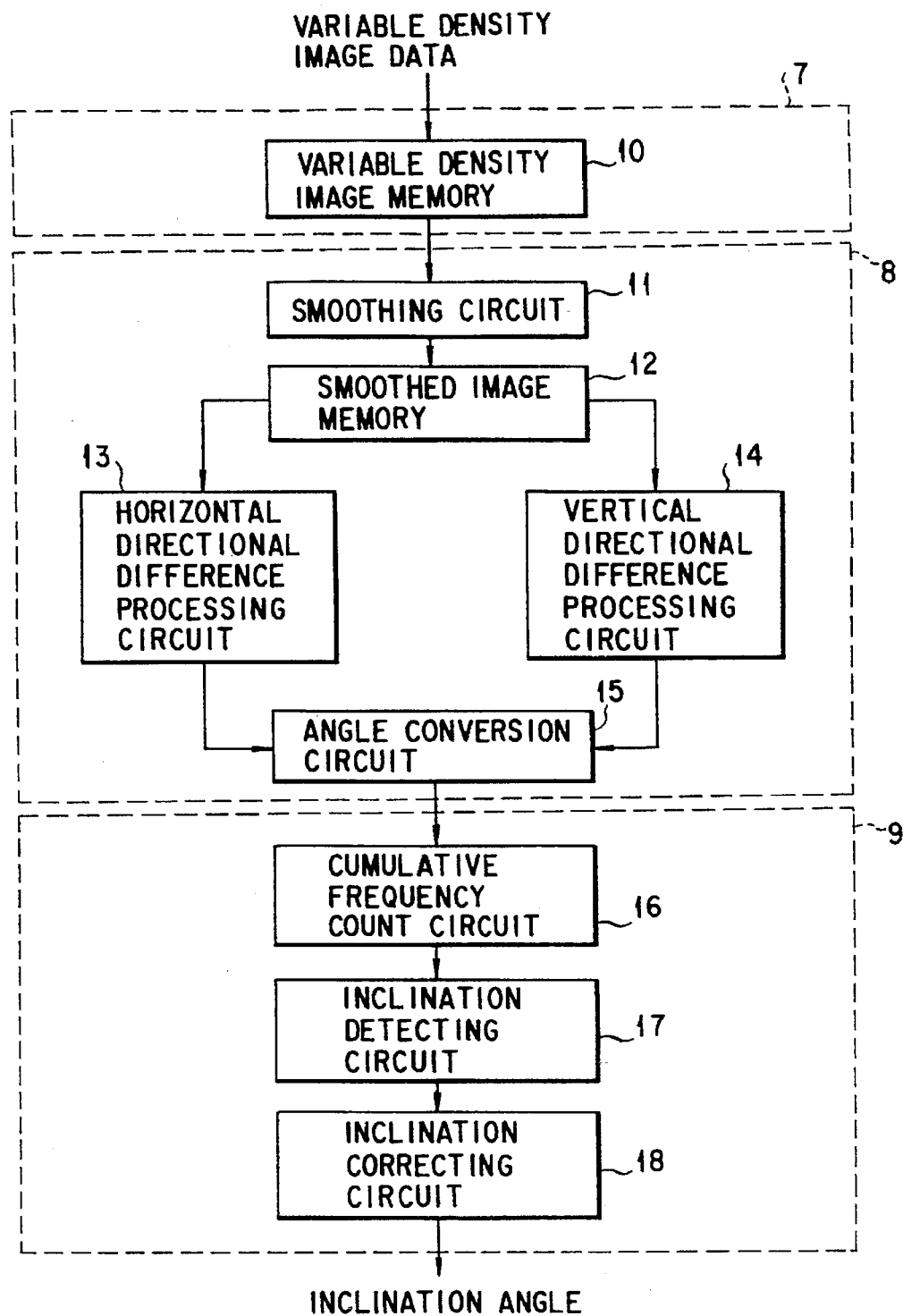
F I G. 3

| 1 | 0 | -1 |
|---|---|---|
| 1 | 0 | -1 |
| 1 | 0 | -1 |
19
$$\Delta h_{ij} = \sum_{ii,jj=-1}^{1} \text{IMAGE}[i+ii][j+jj] \cdot \text{FILTER}[ii][jj]$$
F I G. 4A
| 1 | 1 | 1 |
|---|---|---|
| 0 | 0 | 0 |
| -1 | -1 | -1 |
20
$$\Delta v_{ij} = \sum_{ii,jj=-1}^{1} \text{IMAGE}[i+ii][j+jj] \cdot \text{FILTER}[ii][jj]$$
F I G. 4B
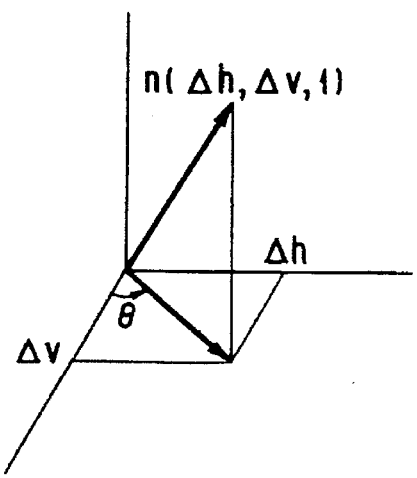
F I G. 5

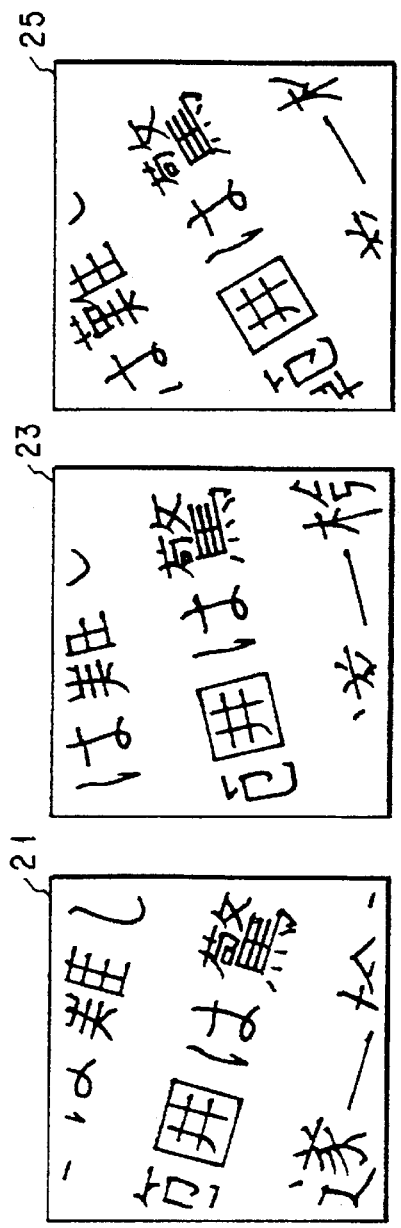
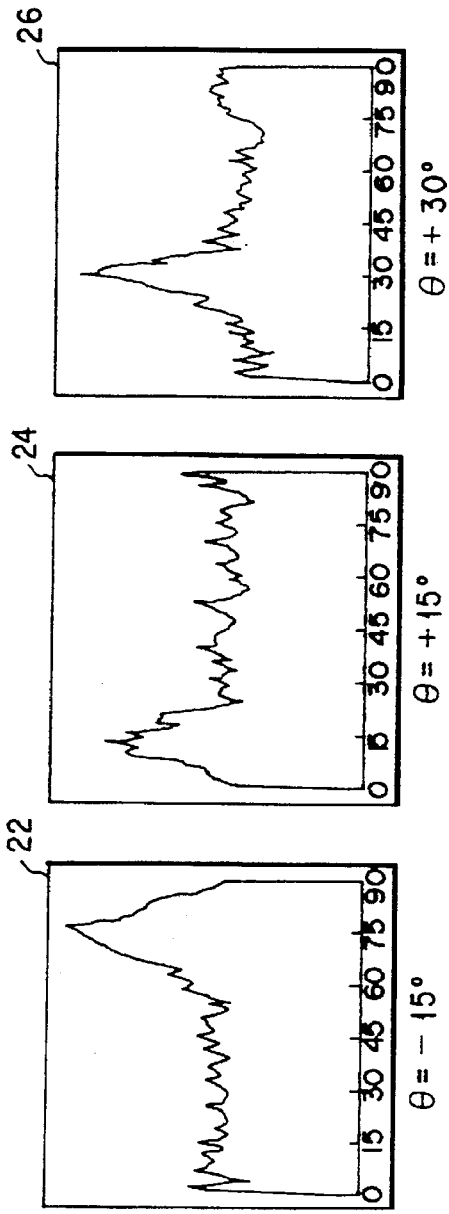
FIG. 6A  FIG. 6B  FIG. 6C
FIG. 6D  FIG. 6E  FIG. 6F
$\theta = -15°$  $\theta = +15°$  $\theta = +30°$

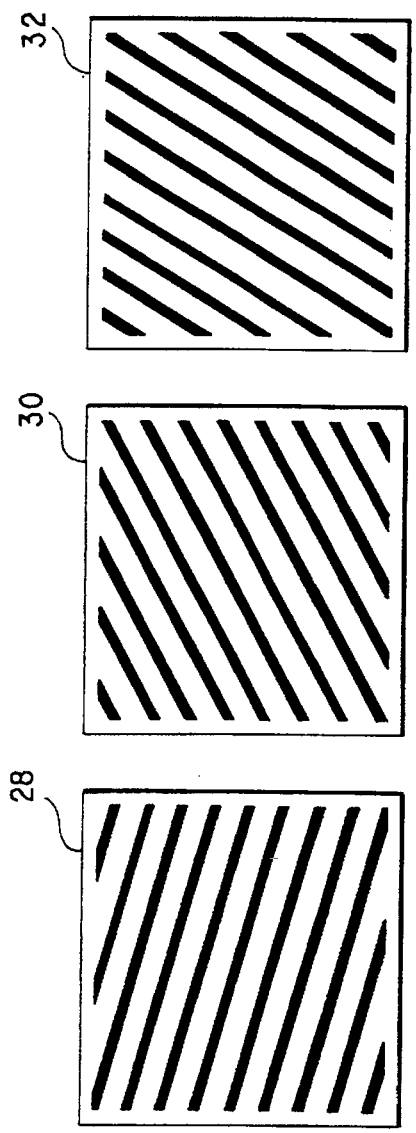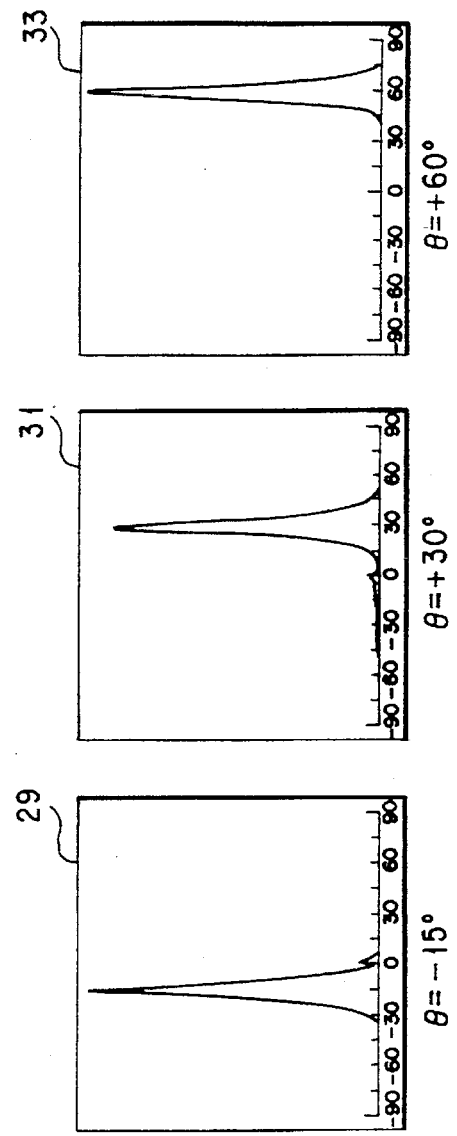

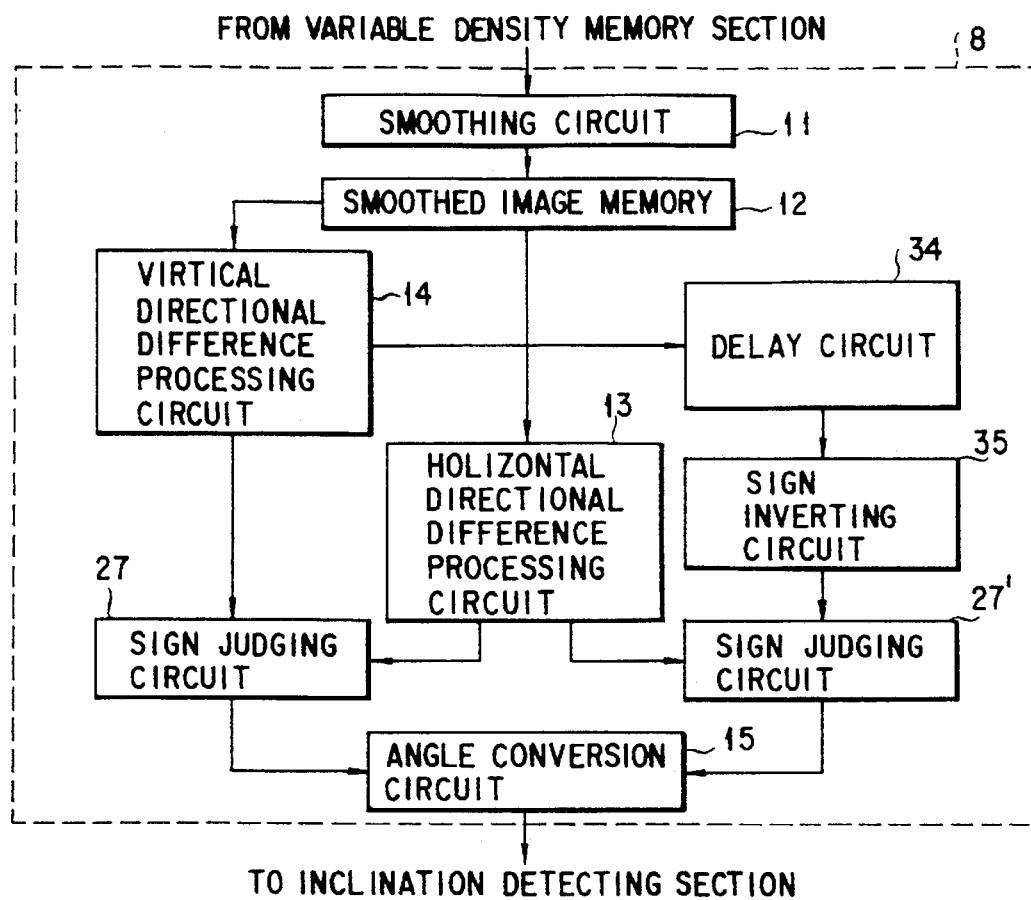
F I G. 10
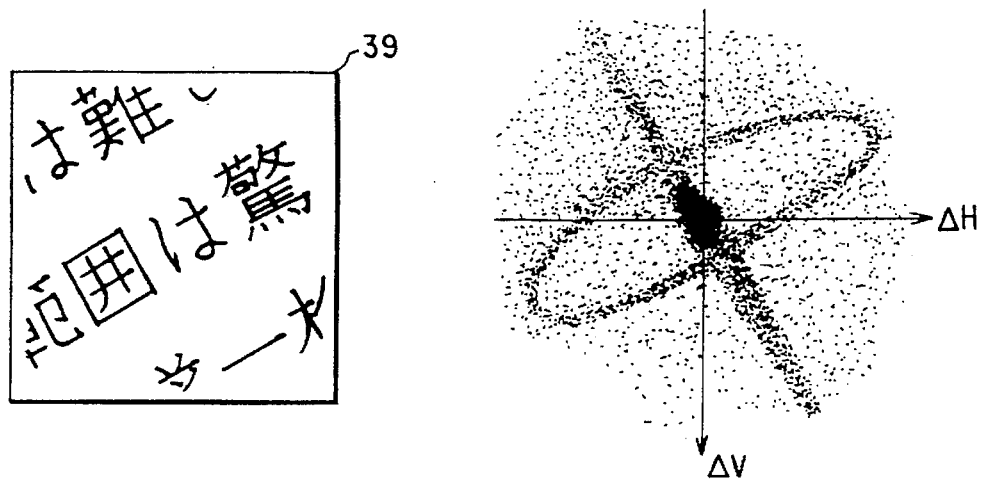
F I G. 11A        F I G. 11B

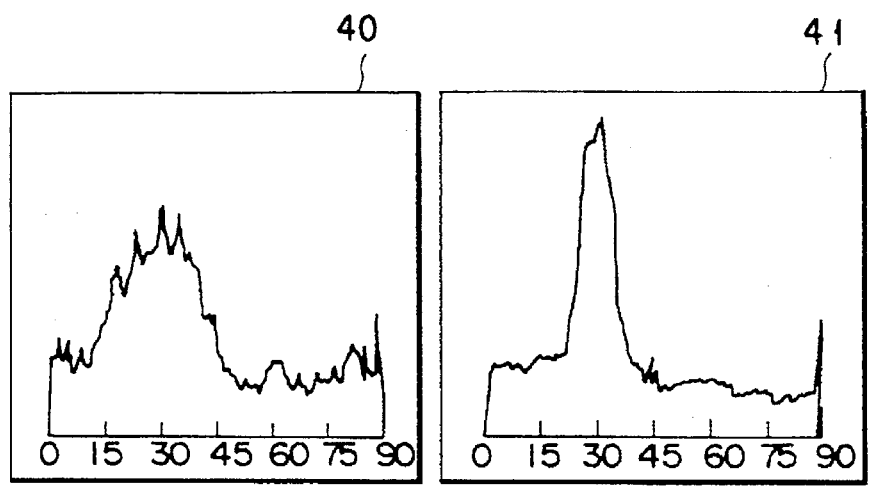
F I G. 13A    F I G. 13B
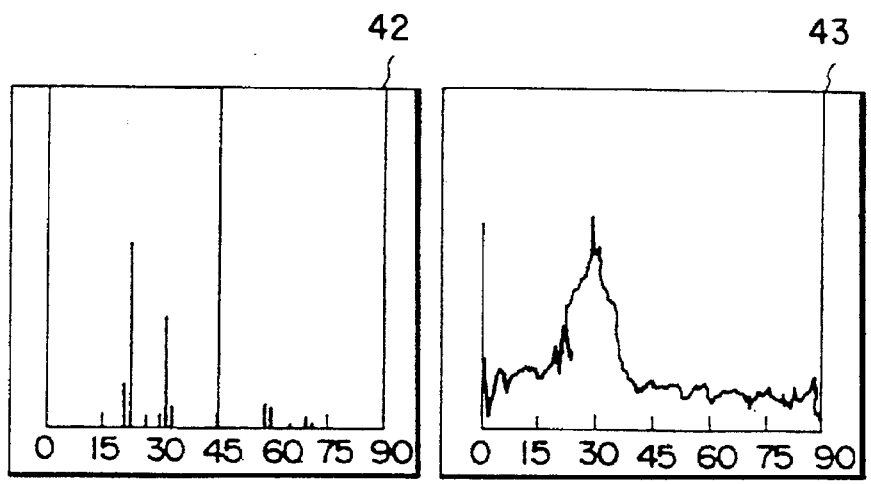
F I G. 13C    F I G. 13D

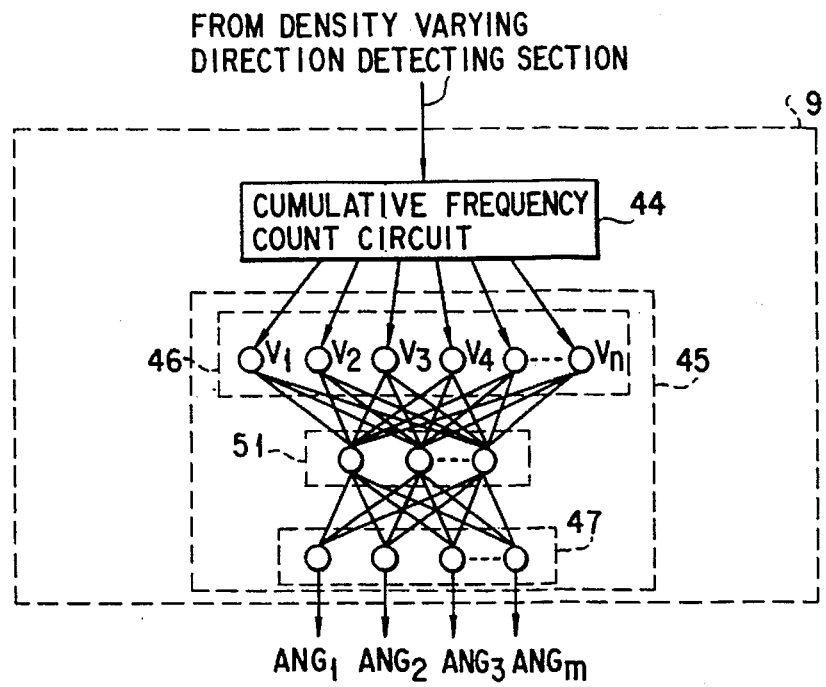
F I G. 15
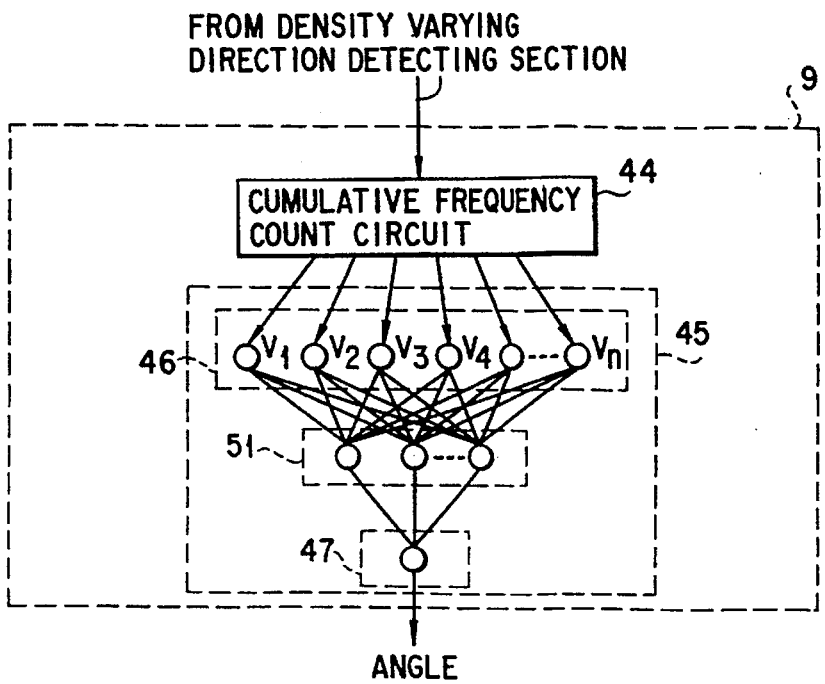
F I G. 16

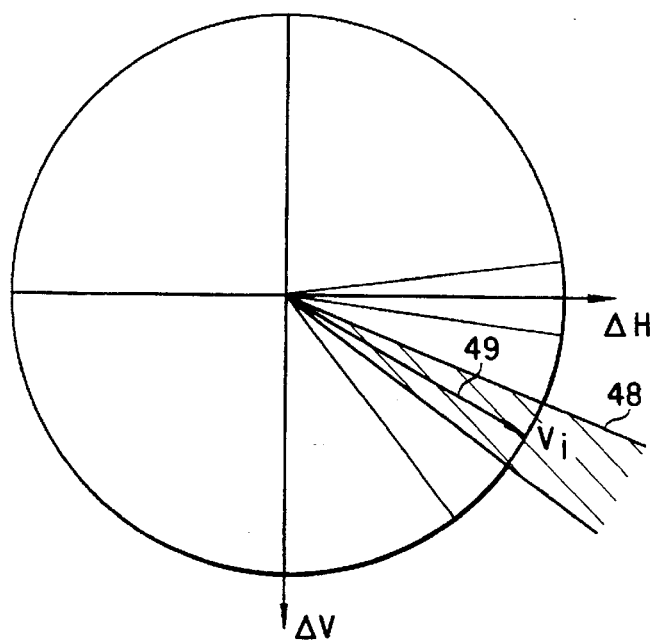
F I G. 17A
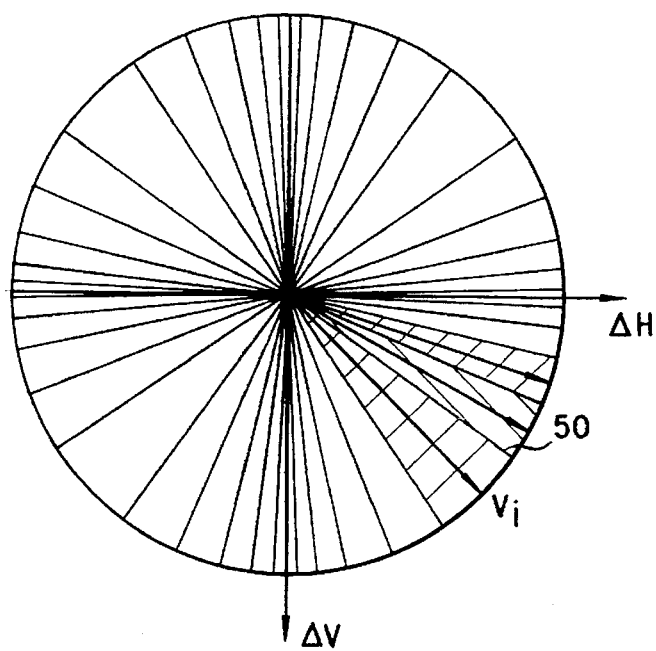
F I G. 17B

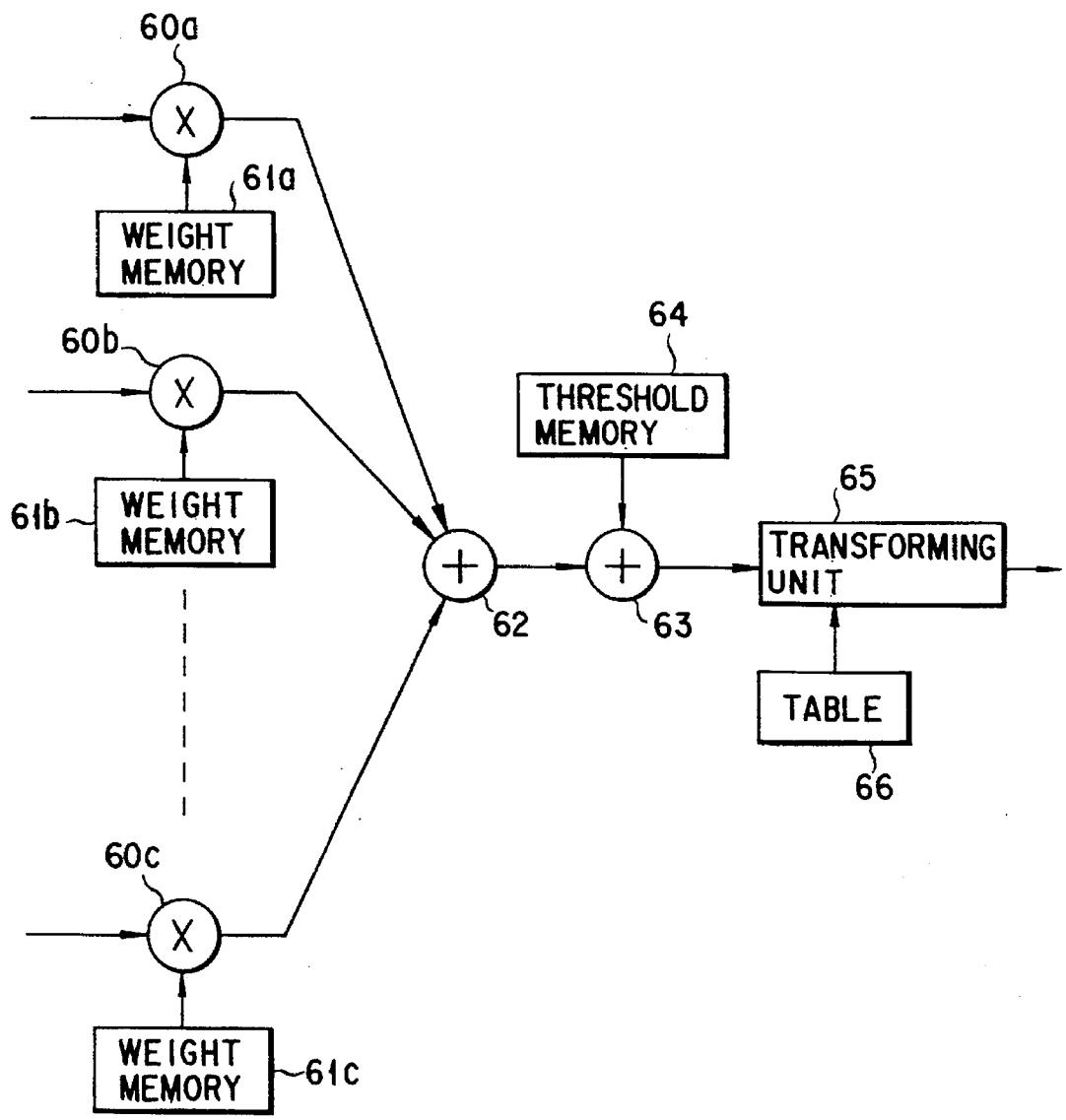
F I G. 18

DEVICE FOR DETECTING THE INCLINATION OF IMAGE

BACKGROUND OF THE INVENTION

1. Field of the Invention

This invention relates to an inclination detecting device for use in an image reading apparatus.

2. Description of the Related Art

Where printed documents are optically read, and accumulated or transmitted as digital image data, a compression is performed in order to reduce the amount of data to be accumulated or transmitted. At the time of compression, the structure of each document is analyzed, with the result that character portions thereof are recognized and encoded, or image portions are taken out and compressed, in order to enhance the compression efficiency. However, if an inclined document is input, it cannot be read correctly. To avoid this, it is necessary to detect the inclination of the document and correct the inclination before reading and compression processing.

In general, a method is employed, which utilizes characters arranged in line to detect the inclination of a document inputted in an inclined manner. In the prior art disclosed, for example, in Jpn. Pat. Appln. KOKAI Publication No. 63-282584, the number of white pixels are counted, which continuously extend from two side edges substantially perpendicular to the direction in which characters are arranged, thereby detecting peripheral features, determining the direction of rotation from the negative and positive averages of the first-order differentiation values of the peripheral features, and extracting points corresponding to the peripheral features in accordance with the direction of rotation. Thus, the inclination of the document is detected.

As is shown in FIG. 14, the conventional inclination detecting device comprises: a digitizing section 1 for converting to a binary number signal a document image obtained by optically scanning each document; a peripheral feature extracting section 2 for extracting the peripheral features of the document image digitized in the digitizing section 1, from two side edges substantially perpendicular to each line of characters contained in the document image; a first-order differentiation section 3 for subjecting the peripheral features to first-order differentiation; a rotational direction detecting section 4 for determining the direction of rotation from the negative and positive averages of the first-order differentiation values; a corresponding point extracting section 5 for extracting two corresponding points of the peripheral features in accordance with the direction of rotation; and an inclination detecting section 6 for detecting the inclination of the document image on the basis of the extracted corresponding points.

In the above-described structure, the digitized document image has its peripheral features extracted in the peripheral feature extracting section 2. The extraction is performed by scanning a document image from two side edges substantially perpendicular to each line of characters in the document image (for example, the right and left sides in the case where the character line is horizontal), thereby counting the number of white pixels until a first black pixel is detected. The extracted left and right peripheral features are subjected to first-order differentiation in the first-order differentiation section 3. In the rotational direction detecting section 4, the positive and negative averages of one (e.g., the left one) of the differentiated left and right peripheral features are calculated. If the positive average is higher than the negative average, it is determined that forward rotation has been performed, whereas if the negative average is higher than the positive average, it is determined that backward rotation has been performed. In the corresponding point extracting section 5, varied points of the left and right peripheral features are detected, and the relationship therebetween is determined in accordance with the direction of rotation. In the inclination detecting section 6, the angle of inclination is determined with the use of the corresponding points. Thus, the inclination of the input document image is detected.

In the prior art, there are some other inclination detecting methods as follows:

A method wherein the outline of an image is extracted, a circumscribed rectangle of the image is obtained, feature amounts are integrated by sequentially changing the angle of scanning where the feature amount indicates the bottom side of the rectangle and the lower left vertex of the rectangle indicates the position coordinates, thereby detecting the direction in which a sharpest peak is found in a histogram indicating the integration results, to determine the inclination of the image. A method wherein a candidate point for inclination detection is determined on the basis of the arrangement of black and white pixels in a diagonal line of an input image, the continuity of white pixels from the candidate point is inspected, and the center point of the width of an angle at which the longest white run is detected is obtained, to detect the inclination of the image. A method wherein the degree of complexity is determined on the basis of the number of times of shift from a white pixel to a black pixel as a result of scanning an input image, a candidate region for inclination detection is obtained from complexity degrees in the horizontal direction, and the direction in which the greatest complexity is obtained is determined as a result of sequentially changing the scanning angle, to detect the inclination of the image.

In order to effectively detect the inclination of a document image even where there is no linear line of characters therein, it is required that the inclination of the image be detected from a local region of the image; in other words, the inclination of the image be determined from the inclination of e.g. a character itself. However, in the prior art, detection of inclination cannot be performed without utilizing linear arrangement of characters.

Moreover, the conventional inclination detection is complicated, and hence requires long time and large-scale hardware.

SUMMARY OF THE INVENTION

It is the object of the invention to provide an apparatus simple in structure and small in size, capable of detecting the inclination of a document image irrespective of the relationship in position between characters in the image, even if there is no linear line of characters, that is, if image constituting elements including the characters scatter.

To attain the object, there is provided an inclination detecting device comprising:

variable density image memory means for storing at least part of a variable density image obtained as a result of optically scanning a document image;

density varying direction detecting means for detecting density varying directions from the variable density image stored in the variable density image memory means; and inclination detecting means for detecting the inclination of an image constituting element from the distribution of density varying directions detected by the density varying direction detecting means.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a block diagram, showing an inclination detecting device according to a first embodiment of the invention;

FIGS. 4A and 4B are views, useful in explaining a difference filter;

FIG. 5 is a view, useful in explaining means for converting a density varying direction to a line segment inclination;

FIGS. 6A to 6F are views, showing examples of inclination detection;

FIGS. 9A to 9F are views, showing examples of inclination detection in the second embodiment of the invention;

FIG. 10 shows a modification of the second embodiment;

FIGS. 11A and 11B are views, useful in explaining the distribution of density varying vectors;

FIGS. 13A to 13D are histograms, showing directions in which line segments extend in the case of using a smoothing circuit and in the case of using no smoothing circuit;

FIG. 15 is a view, showing an inclination detecting device according to a fourth embodiment of the invention;

FIG. 16 is a modification of the fourth embodiment;

FIGS. 17A and 17B are views, useful in explaining the operation of the fourth embodiment; and FIG. 18 is a view, illustrating neuron units formed in intermediate and output layers.

DETAILED DESCRIPTION OF THE PREFERRED EMBODIMENTS

First, a first embodiment of the invention will be explained with reference to accompanying drawings showing thereof.

In this embodiment, the inclination of each of image constituting elements, such as characters, contained in local regions of a read image is determined, and therefore inclination detection can be performed irrespective of the relationship in position between the image constituting elements. This embodiment utilizes the fact that each image constituting element generally comprises many horizontal and vertical line segments. The density varying direction of pixels in a local region, which includes an image constituting element, is determined, and the outline of the density variation distribution is inspected to detect the inclination of each image-constituting element itself.

Figure 1:
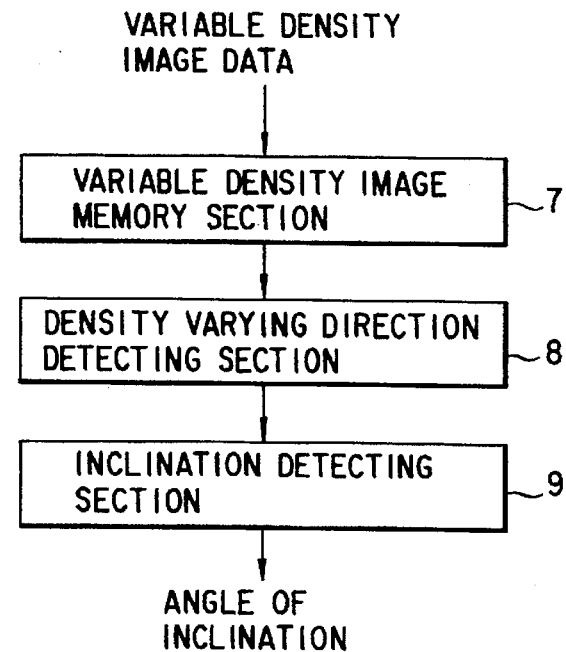
FIG. 1 is a view, illustrating the concept of an inclination detecting device according to the invention.

FIG. 1 is a view, illustrating the concept of an inclination detecting device for performing the above-described detection. In FIG. 1, a variable-density image memory unit 7 stores at least part of a variable-density image obtained by optically scanning a document, etc. A density varying direction detecting unit 8 detects the density varying directions of pixels from the variable-density image stored in the memory unit 7. An inclination detecting unit 9 detects the inclination of an image constituting element, such as a character, from the distribution of the density varying directions.

FIG. 3 more specifically shows the inclination detecting device of FIG. 1. As is shown in FIG. 3, the variable-density image memory unit 7 includes a variable-density image memory 10 for storing a variable density image obtained by optically scanning a document, etc. The density varying direction detecting unit 8 has a smoothing circuit 11 for smoothing the variable density image, a smoothed image memory 12 for storing the smoothed image, a horizontal directional difference processing circuit 13 for scanning in the horizontal direction the smoothed image stored in the smoothed image memory 12, a vertical directional difference processing circuit 14 for scanning in the vertical direction the smoothed image, and an angle conversion circuit 15 for calculating density varying directions on the basis of the horizontal and vertical directional differences.

Further, the inclination detecting unit 9 has a cumulative frequency count circuit 16 for counting the cumulative detection frequency of each inclination angle calculated by the angle conversion circuit 15 to provide a histogram; an inclination detecting circuit 17 for detecting that displacement of the cumulative frequency distribution pattern from a predetermined position, which indicates the inclination of an image constituting element; and an inclination correcting circuit 18 for correcting the inclination angle detected by the inclination detecting circuit 17 to a value falling within an allowable range of the inclination of an input image, and generating the corrected angle.

In the above-described structure, a variable density image picked up by an image pick-up device is stored in the variable-density image memory 10. The stored image is supplied to the smoothing circuit 11 and smoothed. The smoothed image is stored in the smoothed image memory 12. The smoothing circuit 11 has a structure wherein, for example, the value of a target pixel is replaced with the average of 8 pixels located in the vicinity thereof. In the horizontal and vertical directional difference processing circuits 13 and 14, differences regarding the smoothed image stored in the smoothed image memory 12 are obtained by scanning the image in the horizontal and vertical directions, respectively. The differences are supplied to the angle conversion circuit 15.

In the angle conversion circuit 15, for example, the ratio of the horizontal difference to the vertical directional difference is calculated, and angles corresponding to the density varying directions of pixels are obtained with reference to a table describing inverse tangential values. In the cumulative frequency count circuit 16, the cumulative detection frequency of each angle obtained in the angle conversion circuit 15 is counted to provide a histogram.

Figures 2A, 2B:
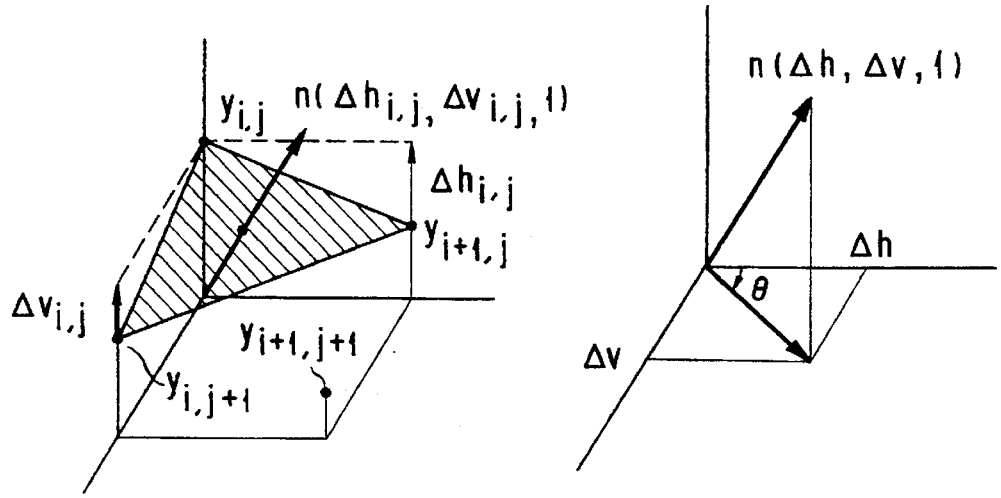
FIGS. 2A and 2B are views, useful in explaining means for calculating a density varying direction.

The above-described operation will be explained in more detail with reference to FIGS. 2A and 2B. Suppose that the coordinates of a target pixel is (i, j), and the brightness of the pixel is indicated by $y_{i,j}$. Then, the difference $\Delta h_{i,j}$ in brightness between the target pixel and a pixel adjacent thereto in the horizontal direction, and the difference $\Delta_{v i,j}$ in brightness between the target pixel and a pixel adjacent thereto in the vertical direction are given by $$\Delta h_{i,j} = y_{i,j} - y_{i+1,j}$$

$$\Delta v_{i,j} = y_{i,j} - y_{i,j+1}$$

The vector n of the normal line of a fine brightness plane formed by the above three pixels is ($\Delta h$, $\Delta v$, 1). Accordingly, each of inclination angles $\theta_{i,j}$ corresponding to the density varying directions in a fine region is given by $$\theta_{i,j} = \arctan(\Delta v_{i,j}/\Delta h_{i,j})$$

Thus, all the inclination angles $\theta_{i,j}$ in a target image region are sequentially calculated, and the cumulative detection frequency of each inclination angle $\theta$ is counted to provide a histogram. Here, note that such pixels as provide a normal line vector n having a value smaller than a predetermined threshold value should not be counted in order to reduce the influence of noise.

In general, the frequency of use of Chinese Kanji characters (hereinafter simply called "Kanji character") is high in Japanese printed documents, in particular, in a leading title, etc. where characters are scattered. Each printed Kanji character has many horizontal and vertical line segments, and hence the cumulative detection frequency distribution of each inclination angle $\theta$ corresponding to a density varying direction provides a pattern having peaks at an interval of 90° due to horizontal and vertical components of a Kanji character. If the Kanji character does not incline, the peaks appears at 0° and 90°. However, the higher the degree of inclination of the Kanji character, the more the position of the peak is displaced. This being so, the inclination of a document image can be determined by detecting the peak position with the use of the inclination detecting circuit 17, and correcting the detected position with the use of the inclination correcting circuit 18 such that it falls within a predetermined range.

The inclination detecting circuit 17 may be actually a simple peak position detecting circuit for searching a maximum value, or may be a circuit for comparing a pattern of detected peaks with a prestored pattern in order to determine the amount of displacement from a histogram obtained when an object region does not incline.

Although in the embodiment, smoothing is performed before calculating a difference value so as to more sharpen the peaks of a histogram regarding each density varying direction, a similar effect can be obtained by using a Prewitt filter as shown in FIGS. 4A and 4B to obtain a difference value, instead of performing smoothing before the calculation thereof.

In the embodiment, however, the smoothing circuit is not an indispensable element, but an optional element to be used depending upon the properties of an image to scan.

FIGS. 13A to 13D are views, showing histograms regarding the directions of inclination of line segments where a sample image with an inclination of 30° is used in order to examine the effect of a smoothing circuit. Histogram 40 of FIG. 13A shows the distribution of the inclination directions of unsmoothed line segments. Histogram 41 of FIG. 13B shows the directions of inclination of smoothed line segments. Histogram 42 of FIG. 13C shows the distribution of the inclination directions of unsmoothed line segments of an image obtained by expressing the sample image by use of a quaternary number system in which the sample image is quantized to have four gradations. Histogram 43 of FIG. 13D shows the distribution of the inclination directions of smoothed line segments of the image expressed by use of such a quaternary number system.

As is evident from these figures, although the inclination detection can be performed without using a smoothing circuit, each peak of the histogram is sharpened with the use of the smoothing circuit, and more accurate inclination detection can be performed. In particular, in the case of an image with small gradation, the histogram contains only scattered values, and therefore a smoothing circuit can provide a remarkable effect.

Moreover, in order to cause the inclination angle, to be detected, to correspond to an apparent inclination of a line segment, but not to correspond to the direction of density variation, $\theta$ can be defined as shown in FIG. 5, and given by the following equation:

$$\theta = \arctan(\Delta h/\Delta v)$$

FIGS. 6A to 6F are views, showing cumulative detection frequency distributions regarding the directions of inclination of line segments, obtained as a result of performing inclination detection of a sample image in the same manner as employed in the first embodiment. Image 21 of FIG. 6A shows a sample image obtained when the inclination of the sample image is −15°, and Image 22 of FIG. 6D shows a histogram indicating the distribution of the inclination directions of line segments which constitute the image of FIG. 6A ($\Delta h^2 + \Delta v^2 \geq 100$).

Image 23 of FIG. 6B and image 24 of FIG. 6E are views similar to FIGS. 6A and 6D, respectively, obtained when the inclination of the sample image is +15°, while image 25 of FIG. 6C and image 26 of FIG. 6F are views similar to FIGS. 6A and 6D, respectively, obtained when the inclination of the sample image is +30°.

In the above cases, the sharpest peaks are found at 75°, 15° and 30°, respectively. Since it is presupposed that the inclination of each input image falls within a range of ±45°, 75° is replaced with −15° perpendicular thereto by means of the inclination correcting circuit 18, and thus −15°, +15° and +30° are outputted.

As explained above, the inclination of a document image can be detected irrespective of the relationship in position between characters.

In the above-described first embodiment, the properties of each printed Kanji character are utilized. That is, the inclinations of line segments constituting a printed Kanji character are determined from the density varying directions in a local region which includes the Kanji character, and the pattern of the cumulative detection frequency distribution of each inclination angle is inspected, thereby detecting the inclination of the character. Therefore, even when there is no linear line of characters, i.e., characters are scattered, the inclination of a document image can be detected irrespective of the relationship in position between characters. Further, since the inclination of a character itself is detected, the inclination of a document image can be detected even from a single character at minimum. Since the part of a document image which is obtained after region separating processing is used for detecting the inclination of the overall image, the inclination detection can be effectively performed.

Moreover, since in the first embodiment, detection is performed in a region which includes, for example, a printed Kanji character which consists of many horizontal and vertical line segments, the detection can be performed by the use of only one of the horizontal directional difference and the vertical directional difference. Thus, the structure of the device can be simplified.

A second embodiment of the invention will now be explained. In this embodiment, elements similar to those employed in the first embodiment shown in FIG. 3 are denoted by corresponding reference numerals, and no explanation will be given thereof. The second embodiment employs a density varying direction detecting unit 8 as shown in FIG. 7, instead of that shown in FIG. 3.

Figure 7:
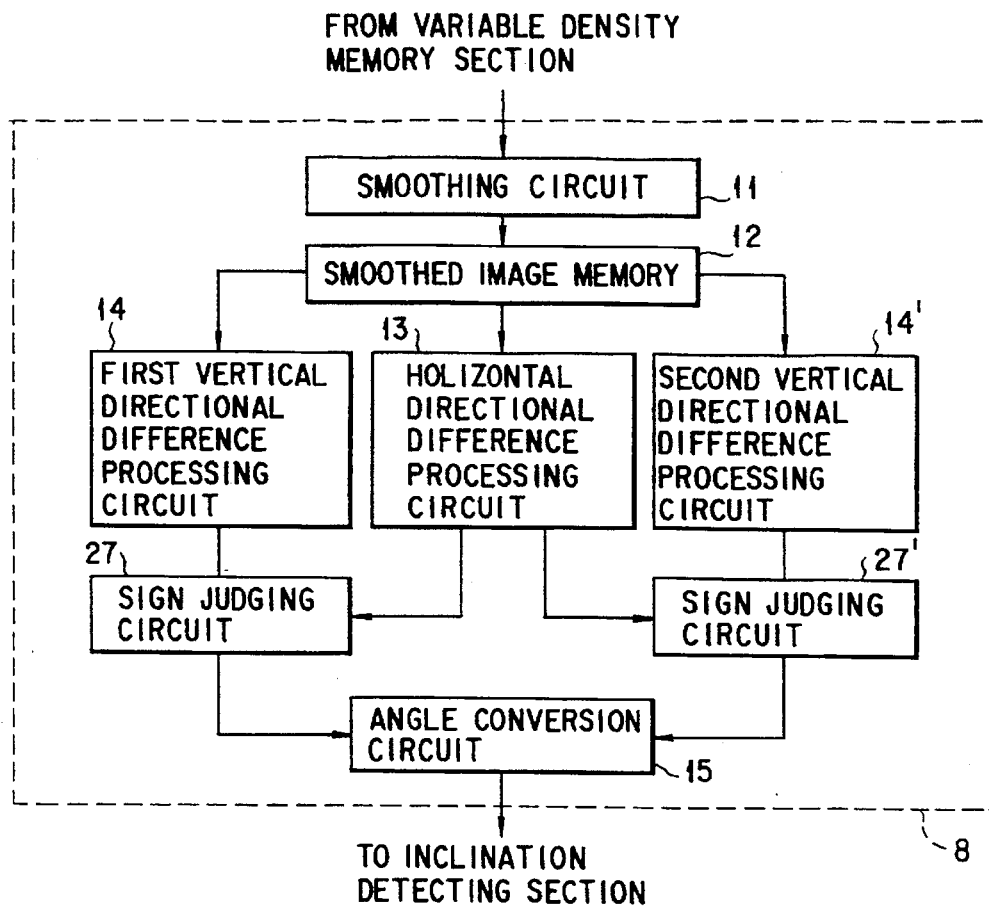
FIG. 7 is a block diagram, showing an inclination detecting device according to a second embodiment of the invention.

In FIG. 7, reference numeral 14' denotes a second vertical directional difference processing circuit 14' for scanning a smoothed image, stored in the smoothed image memory 12, in a direction opposite to the direction in which the first vertical directional difference processing circuit 14, thereby obtaining a difference. Reference numeral 27 denotes a sign judging circuit for judging whether or not the horizontal and vertical directional differences from the horizontal directional processing circuit 13 and the first vertical directional difference processing circuit 14 have the same sign (+ or −), and supplying an output to the angle conversion circuit 15 only when they have the same sign. Further, reference numeral 27' denotes a sign judging circuit for subjecting the differences from the horizontal directional processing circuit 13 and the second vertical directional difference processing circuit 14', to processing similar to that performed by the sign judging circuit 27.

In the above structure, the second vertical directional difference processing circuit 14' scans a smoothed image, stored in the smoothed image memory 12, in a direction opposite to the direction in which the first vertical directional difference processing circuit 14, thereby obtaining a difference $\Delta v'$, given by the following equation:

$$\Delta v'_{i,j} = y_{i,j} - y_{i,j-1}$$

The sign judging circuit 27 judges whether or not the horizontal and vertical directional differences from the horizontal directional processing circuit 13 and the first vertical directional difference processing circuit 14 have the same sign (+ or −), and supplies an output to the angle conversion circuit 15 only when they have the same sign. Further, the sign judging circuit 27' subjects the differences from the horizontal directional processing circuit 13 and the second vertical directional difference processing circuit 14', to processing similar to that performed by the sign judging circuit 27. That is, the density varying direction $\theta'_{i,j}$ is expressed by $$\theta'_{i,j} = -\arctan(\Delta v'_{i,j}/\Delta h_{i,j})$$

Thus, in the second embodiment, the value of arctan is limited by the sign judging circuits 27 and 27', and the following relationship is satisfied at all times:

$$\theta > 0 \quad \theta' < 0$$

This means that the value $\theta$ is selected for a line segment having a gradient of a positive sign, and the value of $\theta'$ is selected for a line segment having a gradient of a negative sign.

Figures 8A, 8B:
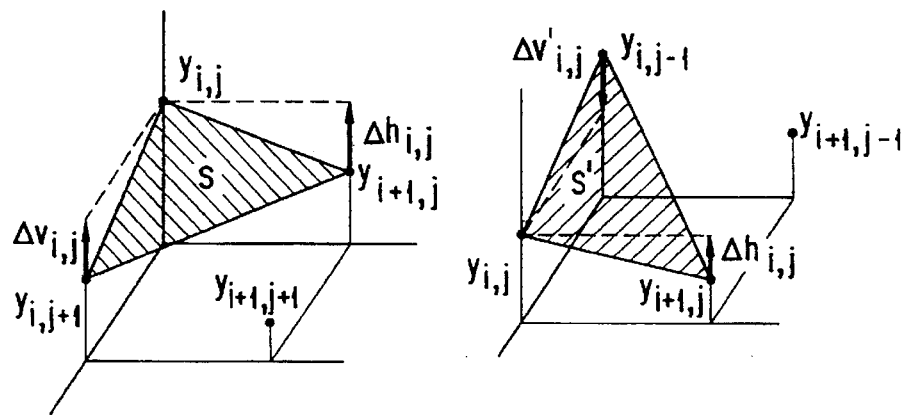
FIGS. 8A and 8B are views, useful in explaining means for setting a fine brightness plane.

The above operation will be explained in more detail with reference to FIGS. 8A and 8B. FIG. 8A shows the normal line direction of a fine brightness plane S which is defined as a plane defined by a brightness of a given pixel and a brightness of pixels which are adjacent to the given pixel in the horizontal and vertical directions obtained from the horizontal directional difference $\Delta h_{i,j}$ and the first vertical directional difference $\Delta v_{i,j}$ with respect to the left upper three pixels of adjacent four pixels, as in the first embodiment. On the other hand, FIG. 8B shows the normal line direction of a fine brightness plane S' obtained from the horizontal directional difference $\Delta h_{i,j}$ and the second vertical directional difference $\Delta v'_{i,j}$ with respect to the left lower three pixels of adjacent four pixels. In the FIG. 8A case, $\Delta h$ and $\Delta v$ have the same positive sign, whereas in the FIG. 8B case, $\Delta h$ has the positive sign, but $\Delta v$ has the negative sign. Thus, as regards these adjacent four pixels, the fine brightness plane S is set and the value $\theta$ is selected.

As described above, the density varying direction is determined from two fine brightness planes in the second embodiment, for the following reason:

At the time of determining the density varying direction from differences between adjacent pixels, it is desirable to set a fine brightness plane so that the horizontal directional difference and the vertical directional difference can have the same sign in order to sharpen the peak of the angle distribution. There is no problem in the case of scanning a region which contains a printed Kanji character having many horizontal and vertical line segments. However, in the case of scanning a region which contains only vertical line segments or only horizontal line segments (such as a bar code), if the line segments have the negative sign, horizontal directional and vertical directional differences have different signs. As a result, the peak of the angle distribution will be relatively flattened, and hence the inclination may not be accurately calculated.

To avoid this, as shown in FIGS. 8A and 8B, two of the four fine brightness planes each formed by three of the adjacent four pixels are set, and it is determined whether or not the horizontal directional difference and the vertical directional difference in each of the two brightness planes have the same sign, thereby subjecting the differences to angle conversion only when they have the same sign. If the adjacent four pixels are arranged in substantially the same plane, one of the two fine brightness planes satisfies the above conditions, and therefore the distribution of density varying directions can provide a sharp peak irrespective of the kind of the signs.

FIGS. 9A to 9F show the cumulative detection frequency distributions of the inclination directions of line segments in the second embodiment. 28 of FIG. 9A shows a sample image obtained when its inclination is −15°, and 29 of FIG. 9D shows a histogram indicating the distribution of the inclination directions of line segments which constitute the image of FIG. 9A ($\Delta h^2 + \Delta v^2 \geq 100$).

30 of FIG. 9B and 31 of FIG. 9E are views similar to FIGS. 9A and 9D, respectively, obtained when the inclination of the sample image is +30°, while 32 of FIG. 9C and 33 of FIG. 9F are views similar to FIGS. 9A and 9D, respectively, obtained when the inclination of the sample image is +60°. As is evident from these figures, sharp peaks are found irrespective of whether the line segments of the sample image incline in positive directions or in negative directions.

From the thus-obtained cumulative detection frequency distributions of the inclination directions of line segments, the inclination of the sample image is detected in a manner employed in the first embodiment. Accordingly, the inclination of a document image can be detected irrespective of the relationship in position between characters.

In the above-described second embodiment, the properties of each printed Kanji character are utilized. That is, the inclinations of line segments constituting a printed Kanji character are determined from the density varying directions in a local region including the Kanji, and the pattern of the cumulative detection frequency distribution of each inclination angle is inspected, thereby detecting the inclination of a document image. Therefore, even when there is no linear line of characters, i.e., when characters are scattered, the inclination of a document image can be detected irrespective of the relationship in position between characters. Further, since the inclination of a character itself is detected, the inclination of a document image can be detected even from a single character at minimum. Moreover, since the part of a document image which is obtained after region separating processing is used for detecting the inclination of the overall image, the inclination detection can be effectively performed.

Moreover, since in the second embodiment, the density varying directions are detected with the use of two-directional differences, even a region which includes line segments extending only in a single direction (e.g. bar code) can be subjected to inclination detection, as well as a region including a Kanji character which consists of many vertical and horizontal line segments.

To obtain a similar effect, the second vertical directional difference processing circuit 14' shown in FIG. 7 can be replaced with a delay circuit 34 for delaying an output from the vertical directional processing circuit 14 and a sign inverting circuit 35 for inverting the sign of an output from the delay circuit 34, as is shown in FIG. 10. In this case, instead of calculating the second vertical directional difference $\Delta v'$, a value obtained by inverting the vertical directional difference $\Delta v$ is used. This value is given by $$\Delta v'_{i,j} = y_{i,j} - y_{i,j-1}$$
$$= -(y_{i,j-1} - y_{i,(j-1)+1})$$
$$= \Delta v_{i,j-1}$$

By virtue of the above value, an advantage similar to that of the FIG. 7 case can be obtained.

Figure 12:
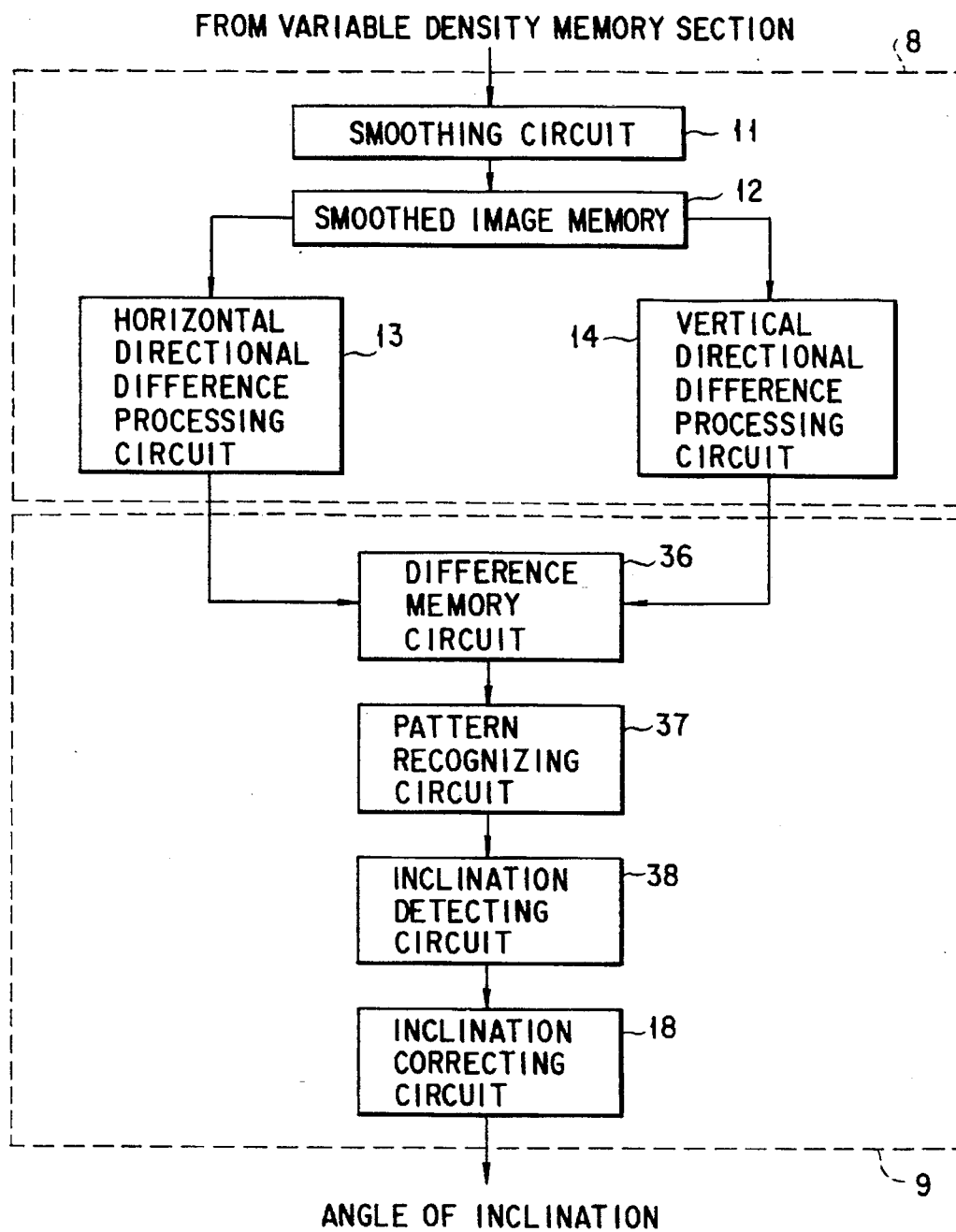
FIG. 12 is a block diagram, showing an inclination detecting device according to a third embodiment of the invention.
Figure 14:
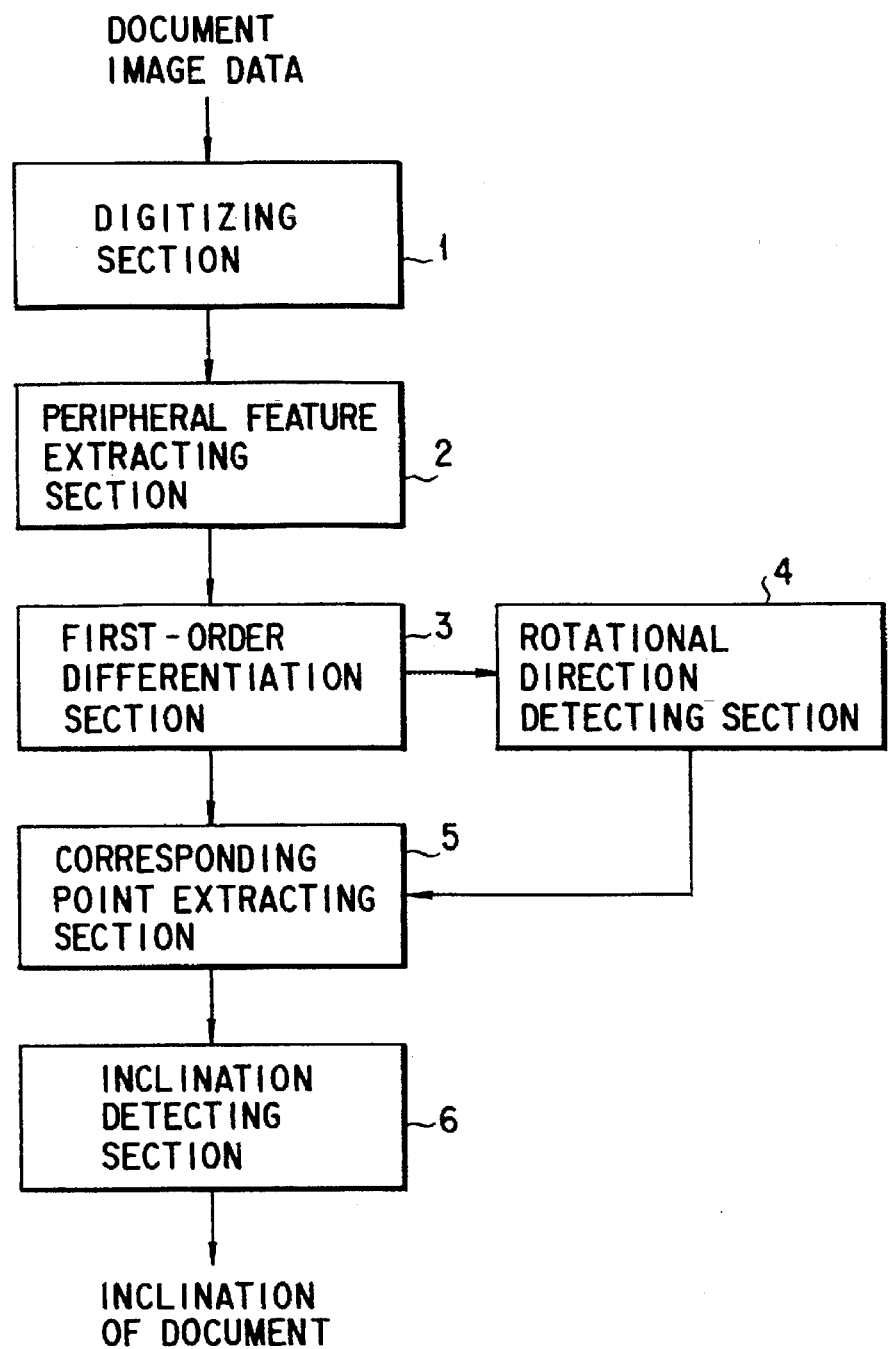
FIG. 14 is a view, showing a conventional inclination detecting device.

A third embodiment of the invention will now be explained. In this embodiment, the density-varying direction detecting unit 8 and the inclination detecting unit 9 have structures as shown in FIG. 12 instead of those shown in FIG. 3. In the third embodiment, elements similar to those shown in FIG. 3 are denoted by corresponding reference numerals, and no detailed explanation will be given thereof.

In FIG. 12, reference numeral 36 denotes a difference memory circuit for storing the positions in a $\Delta H - \Delta V$ plane (density variation vectors) of the horizontal directional and vertical directional differences obtained by the horizontal directional difference processing circuit 13 and the vertical directional difference processing circuit 14. Reference numeral 37 denotes a pattern recognizing circuit for recognizing the distribution pattern of the density variation vectors stored in the memory circuit 36. Reference numeral 38 denotes an inclination detecting circuit for detecting an inclination angle from the pattern recognized by the recognizing circuit 37.

In the above-described structure, the difference memory circuit 36 stores a density variation vector consisting of a horizontal directional difference $\Delta h$ and a vertical directional difference $\Delta v$ obtained by the horizontal directional difference processing circuit 13 and the vertical directional difference processing circuit 14. The pattern recognizing circuit 37 recognizes the distribution pattern in the $\Delta H - \Delta V$ plane of density variation vectors stored in the circuit 36 and corresponding to pixels. The inclination detecting circuit 38 detects the angle of inclination from the pattern recognized by the pattern recognizing circuit 37. The above operation will be explained in more detail with reference to FIG. 11.

The distribution of the horizontal and vertical directional differences $\Delta h$ and $\Delta v$ obtained by the structure shown in FIG. 12 in a region which includes printed Kanji characters as shown in FIG. 11A has a pattern of a cross as shown in FIG. 11B. Since the cross pattern rotates in accordance with the rotation of the characters, the inclination of the region can be detected as a result of recognizing the pattern and calculating the angle of rotation.

Further, the circuit 37 can be formed of a neural network, etc. If an object to be inspected has properties wherein the orientation can be found in pattern as a result of performing learning beforehand, the inclination of any of the elements which constitute the object can be detected. Thus, the inclination of a document image can be determined irrespective of the relationship in position between characters.

As described above, in the third embodiment, the inclination of a document image is detected by utilizing the orientation of each image constituting element. In other words, the inclination of the image is detected by scanning the image in two directions perpendicular to each other, obtaining differences, and inspecting the distribution pattern of the differences in the $\Delta H - \Delta V$ plane. Thus, the inclination detection can be performed irrespective of the relationship in position between the image constituting elements such as characters. Further, since the inclination of each image constituting element itself is detected, the inclination detection can be performed even from a single character at minimum. Since the part of the image which is obtained after region separating processing is used for detecting the inclination of the overall image, the inclination detection can be effectively performed.

Moreover, since in the third embodiment, the inclination of the image is detected by inspecting the distribution pattern of differences in the $\Delta H - \Delta V$ plane, any region of a distribution pattern in which the orientation is found (e.g. a printed Kanji character or a bar code) can be subjected to inclination detection.

A fourth embodiment of the invention will be explained.

An inclination detecting device according to the fourth embodiment has an inclination detecting unit 9 as shown in FIG. 15 in place of that shown in FIG. 3.

Reference numeral 44 denotes a cumulative frequency counting circuit for forming a histogram, regarding a typical angle (or a typical vector), from density varying directions obtained by the density varying direction detecting unit 8. Reference numeral 45 denotes a neural network for receiving the cumulative detection frequency and igniting a neuron unit indicative of a corresponding inclination of an output layer 47.

The neural network of the third embodiment has a three-layer structure. Each unit of an input layer 46 distributes an input signal to all the neuron units of an intermediate layer 51. Each of the neuron units of the intermediate layer 51 and the output layer 47 has a plurality of input terminals and a single output terminal, as is shown in FIG. 18. In each neuron unit of the layers 51 and 47, signals inputted thereto in a parallel manner are multiplied by weight parameters stored in weight memories 61a to 61c with the use of multipliers 60a to 60c, respectively. The thus-obtained signals are summed by an adder 62. A predetermined value stored in a threshold memory 64 is added to or subtracted from the addition result by an adder 63. A transformation unit 65 subjects the output of the adder 63 to linear or non-linear transformation, on the basis of the list stored in a table 66 which describes the relationship between inputs and outputs. In other words, each neuron unit executes the following equation:

$$z = f\left( \sum_{i=1}^{N} w_i y_i - \theta \right) \tag{1}$$

where $y_i$ represents the value of an i-th input terminal, $w_i$ a weight for the i-th input terminal, $\theta$ a threshold value, N the number of input terminals, and f a linear or non-linear transformation function.

In this embodiment, the transformation function f is a sigmoid function given by $$f(X) = \frac{1}{1+e^{-x}} \quad (2)$$

The layered neural network employed in the embodiment can determine the weight coefficient wi and of each neuron unit of the intermediate layer 51 and the output layer 47 by Generalized Delta Rule devised by D. E. Rumelhart, using sample data (see D. E. Rumelhart, J. L. McClelland and the PDP Research Group, "PARALLEL DISTRIBUTED PROCESSING, Vol 1, ch.8", MIT Press, 1986) The Generalized Delta Rule is called also "Error Back Propagation", and changes the weight and threshold value of each neuron unit so as to reduce square error E defined by the following equation:

$$E = \frac{1}{2} \sum_{p=1}^{N} \sum_{i=1}^{m} (z^p_i - d^p_i)^2 \quad (3)$$

where $z^p_i$ represents the output of an output neuron unit i of the neural network obtained when sample data p is inputted, $d^p_i$ a desirable output of the output neuron unit i, N the number of sample data items, and m the number of output units.

In the Error Back Propagation, the weight and the threshold value are updated so as to minimize the square error E by means of a most-quickly reducing method. The amount $\Delta w_{ji}$ of change in the i-th input terminal of a neuron unit j is given by $$\Delta w_{ji} = -\epsilon \frac{\partial E}{\partial w_{ji}} \quad (4)$$

where $\epsilon$ is a positive constant. The change amount $\Delta w_{ji}$ can be obtained by learning using the equation (4), since the threshold value $\theta$ is considered as the weight for the input terminal which is obtained when −1 is always inputted thereto.

A neural network 45 has an input unit corresponding to each typical angle and an output unit corresponding to each typical inclination angle. Further, as is shown in FIG. 16, the neural network can have a single output layer, and the inclination angle can be indicated by an ignition level.

The operation of the above-described fourth embodiment will be explained.

In the cumulative frequency counting circuit 44, typical angles are determined from density varying directions detected by the density varying direction detecting unit 8, and the cumulative detection frequency of each typical angle is counted. In the neural network 45, the cumulative detection frequency of each typical angle obtained by the circuit 44 is inputted to a corresponding unit of the input layer 46, thereby igniting the neuron unit of the output layer 47 which indicates a desired inclination angle. This operation is prestored by learning using the Generalized Delta Rule.

As is shown in FIG. 17A, a density varying direction 49 of each region 48 is represented by a line which extends through a center portion of each region 48. Each region 48 is obtained by equally dividing a 360° range. Each region 48 forms an angle at the center of the 360° range. Further, as is shown in FIG. 17B, the setting can be modified by arranging typical angles in a non-uniform manner such that the inclination angle can be detected with high accuracy in regions in the vicinity of the horizontal and vertical directions, and with low accuracy in regions in the vicinity of a direction of 45°.

In the fourth embodiment, if it is found by learning that the pattern has an orientation, any one of elements which constitute the pattern can be used for detecting the inclination of the pattern. For example, even when inclined characters such as the italics are input, the inclination of the pattern can be detected correctly.

As explained above, the inclination of a document image can be detected irrespective of the relationship in position between characters.

In summary, in the fourth embodiment, the orientation of image constituting elements is utilized, and the detection frequency of each typical angle determined from density varying directions is used as an input to the neural network to detect the inclination of a document, image. Therefore, the inclination of a document image, etc. can be detected irrespective of the relationship in position between image constituting elements such as characters. Moreover, since the inclination of a character itself is detected, the inclination of a document image can be detected even from a single character at minimum. In addition, since the part of a document image which is obtained after region separating processing is used for detecting the inclination of the overall image, the inclination detection can be effectively performed.

In addition, since in the fourth embodiment, the detection frequency of a typical angle is used as an input to the neural network to detect the inclination of a document image, etc., any region which contains a printed Kanji character, a bar code, etc., i.e., any region, in which an orientation can be found, can be used to detect the inclination of a document image. Further, the accuracy of detection can be varied depending upon the angle.

Furthermore, the structures of the density varying direction detecting unit 8 and the inclination detecting unit 9 are not limited to those employed in the first through fourth embodiments, but may be modified in various manners by using other known techniques. Also, the combination of the units 8 and 9 is not limited to those employed, but may be modified, for example, by changing the above-described processing units.

It is a matter of course to perform image processing in a software manner.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An inclination detecting device which is used for a document image-reading device and which reads a document image and detects inclinations of characters and graphics in the document without reference to a positional relationship among a plurality of characters in the document image even if the plurality of characters are scattered, said inclination detecting device comprising:

variable density image memory means for storing at least part of a variable density image obtained as a result of optically scanning a document image;

density varying direction-detecting means for detecting a density varying direction from the variable density image stored in the variable density image memory means; and inclination detecting means for detecting an inclination of characters and graphics in the document from a distribution of density varying directions detected by the density varying direction detecting-means;

said density varying direction-detecting means including:
  means for detecting a first density varying direction which is determined by a brightness of at least three pixels which satisfy first predetermined positional relationships, and a second density varying direction which is determined by another brightness of at least three pixels which satisfy second predetermined positional relationships, said three pixels which determine the first density varying direction and said three pixels which determine the second density varying direction differing from each other at least partially;
  means for controlling a detection output on the basis of components of the first and second density varying directions;
  a horizontal directional difference processing circuit for calculating horizontal directional difference between the brightness of a target pixel and the brightness of a pixel adjacent thereto in a horizontal direction;
  a first vertical directional difference processing circuit for calculating a first vertical directional difference between a brightness of the target pixel and a brightness of a pixel adjacent thereto in a vertical direction;
  a second vertical directional difference processing circuit for calculating a second vertical directional difference by delaying the vertical directional difference obtained by the first vertical directional difference processing circuit and by reversing a sign of the vertical directional difference; and
  an angle conversion circuit for calculating a first density varying direction on the basis of a ratio of the horizontal directional difference to the first vertical directional difference and for calculating a second density varying direction on the basis of the ratio of a horizontal directional difference to the second vertical directional difference.

2. An inclination detecting device according to claim 1, wherein the density varying direction-detecting means further includes smoothing means for smoothing the variable density image before detection of the density varying direction.

3. An inclination detecting device according to claim 1, wherein said inclination detecting means includes an inclination correcting circuit which detects an inclination and corrects the inclination such that the inclination falls within a predetermined angular range.

4. An inclination detecting device according to claim 1, wherein said means for controlling a detection output includes a sign determining circuit which outputs the density varying direction only when the horizontal and vertical components of the detected density varying directions are equal in sign.

5. An inclination detecting device according to claim 1, wherein said inclination detecting means includes:
  a difference storing circuit for storing a plurality of density varying vectors detected by the density varying direction-detecting means in units of pixels; and
  a pattern recognition circuit for recognizing a distribution pattern in planes whose axes correspond to components of the vectors stored in the difference storing circuit.

* * * * *